No. 671,229. Patented Apr. 2, 1901.
W. PAINTER.
PROCESS OF MAKING GLUTINOUS COMPOUNDS.
(Application filed Apr. 22, 1898. Renewed Sept. 17, 1900.)
(No Model.)
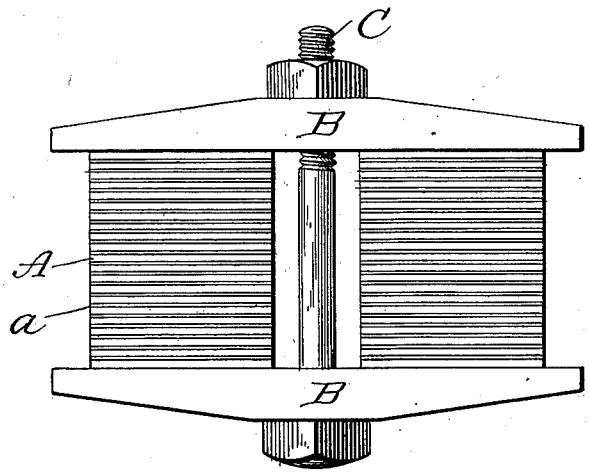

UNITED STATES PATENT OFFICE.

WILLIAM PAINTER, OF BALTIMORE, MARYLAND, ASSIGNOR TO THE CROWN CORK AND SEAL COMPANY, OF SAME PLACE.

PROCESS OF MAKING GLUTINOUS COMPOUNDS.

SPECIFICATION forming part of Letters Patent No. 671,229, dated April 2, 1901.

Application filed April 22, 1898. Renewed September 17, 1900. Serial No. 30,342. (No specimens.)

*To all whom it may concern:*

Be it known that I, WILLIAM PAINTER, a citizen of the United States, residing at Baltimore, Maryland, have invented certain new and useful Improvements in Processes of Making Glutinous Compounds, of which the following is a specification.

My invention relates to the manufacture of compounds and articles in which gluten and a body material—such, for instance, as ground cork—with or without glycerin are the principal elements. Compounds and articles composed of these ingredients, I have found, possess the desirable qualities of elasticity, compressibility, tenacity, uniformity of texture, flexibility, and insolubility in water.

These compounds may be employed for all purposes where materials are needed possessing the characteristics mentioned, and certain of the compounds may be used in place of hard rubber, ebonite, and the like, especially when it is composed of gluten and a body material.

In the formation of the compounds the wet plastic gluten is intimately mixed with the glycerin, so that it is dissolved therein, and then the body material is incorporated into the mixture, though this may be done at the same time that the gluten and glycerin are mixed. This body material may be ground or granulated cork or other substance of a granular, fibro-granular, or fibrous nature. In forming these compounds it is to be understood that the gluten is used in the wet plastic state and that in this state it contains a proportion of water, which may be regarded as its water of constitution, the entire loss of which would render it hard and inelastic unless wholly or in part replaced by the glycerin, and that in the processes herein referred to more or less of this water of constitution may be retained. It is also to be understood that owing to the well-known hygroscopic nature of glycerin for water whatever of the water of constitution may remain in the completed product is prevented from subsequent evaporation while exposed to the atmosphere by the affinity of glycerin for water, the glycerin itself being less votatile than the water which it holds in combination. I have also found that in cases where the water of constitution of the plastic gluten is wholly replaced by the glycerin in the processes of combining the several ingredients if a sufficient proportion of glycerin is thus substituted for the water its affinity for water will cause it to absorb more or less of moisture from the atmosphere after the product is completed. Thus by regulating the amount of glycerin or water of constitution retained in the completed product a certain permanence is given it as to elasticity and pliability.

In carrying out my process I use heat in order to effect the desired change in the gluten which indurates it and renders it more impermeable to water. This step of my present method I refer to in my applications for Letters Patent of the United States, filed January 14, 1898, Serial Nos. 666,662, 666,663, and 666,664. In the use of this indurating temperature higher than that of the atmosphere, or in the drying of the compound at ordinary temperatures there is, I have found, liability of material loss of the glycerin or water of constitution of the gluten during the heating and drying, owing to their volatile nature at the temperatures used. In order to avoid this and to secure other results hereinafter mentioned, I carry on these parts of the method—*i. e.*, the heating or the drying—while the compounds are held under pressure. I am able at the same time to produce the finished material in sheets of compact nature and convenient for various purposes. I show in the drawing how this pressure may be applied, the compound being shown at A and the pressure-heads at B, connected by a bolt C, through which the desired pressure may be applied. This step of subjecting the compounds to pressure while applying the heat thereto or while drying the compound at ordinary temperatures measurably prevents the volatilization and escape of the glycerin and water of constitution of the gluten, and thus the desirable quality of flexibility imparted to the material by the glycerin and water of constitution is maintained in the finished product or in the article made therefrom or to which it may be applied. This pressure also serves to condense the product and gives to it the desired smoothness of surface and tends to render it more impermeable to water. The compound is held under this pressure for any desired length of time, according to the texture of the surface desired or the consistency of the product.

The compound may be rolled into the form of sheets, and these sheets may be placed in the press, with separating sheets of metal *a* or other material between them to prevent them from sticking together, or for some purposes it may be confined under pressure in molds of any desired form.

In applying the heat the press, with the material clamped therein under any desired pressure, may be placed in a suitable oven.

I claim—

1. The herein-described process of treating glutinous compounds consisting in drying the same while under pressure.

2. The herein-described process consisting in mixing gluten and glycerin together to effect the solution of the gluten in the glycerin and then drying the compound while under pressure.

3. The herein-described process of treating glutinous compounds consisting in subjecting the same to heat while under pressure.

4. The herein-described process consisting in mixing gluten, glycerin, and a body material together and then drying the compound while under pressure.

In testimony whereof I affix my signature in presence of two witnesses.

WILLIAM PAINTER.

Witnesses:
   JOHN T. HAWKINS,
   W. H. WHEELER.